(12) United States Patent
Fumio et al.

(10) Patent No.: US 6,515,705 B1
(45) Date of Patent: Feb. 4, 2003

(54) ELECTRONIC CAMERA WITH AN AUTOMATIC LENS COVER

(75) Inventors: Takami Fumio, Suwa (JP); Maruyama Toraji, Nagano Pref (JP); Shirai Osamu, Nagano (JP)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 09/115,232

(22) Filed: Jul. 14, 1998

(30) Foreign Application Priority Data

Jul. 16, 1997 (JP) .......................................... 97-191125

(51) Int. Cl.[7] .............................................. H04N 5/225
(52) U.S. Cl. ....................... 348/375; 348/376; 396/448
(58) Field of Search ................................ 348/207, 373, 348/374, 375, 376; 396/348, 349, 448; H04N 5/225

(56) References Cited

U.S. PATENT DOCUMENTS

| 4,097,133 A | * | 6/1978 | Stemme | 396/419 |
|---|---|---|---|---|
| 4,673,267 A | | 6/1987 | Erxleben | 352/242 |
| 5,212,510 A | * | 5/1993 | Baxter | 396/349 |
| 5,436,686 A | * | 7/1995 | Walsh | 396/535 |
| 5,740,480 A | * | 4/1998 | Kuhn | 396/177 |

* cited by examiner

*Primary Examiner*—Ngoc-Yen Vu
(74) *Attorney, Agent, or Firm*—Hae-Chan Park; McGuireWoods LLP

(57) ABSTRACT

A camera including a body, an image pickup unit including an optical lens system and an image pickup device and being formed to rotate around the body freely; a lens cover opening and closing in front of the optical lens system group; and a lens cover driving unit for driving the lens cover to open while the image pickup unit rotates from an unused position in one direction within a predetermined range, and driving the lens cover to close while the image pickup unit rotates in another direction within a determined range.

13 Claims, 7 Drawing Sheets

ELECTRONIC CAMERA WITH AN AUTOMATIC LENS COVER

BACKGROUND OF THE INVENTION (a) Field of the Invention

The present invention relates to an electronic camera which electronically records an image of an object using an image pickup device such as a CCD (Charge Coupled Device), and more particularly to an electronic camera having an image pickup unit which is capable of free rotation around the camera body.

(b) Description of the Related Art

An electronic camera includes an image pickup device such as a color CCD instead of a film to take a picture of an object. The image of an object is converted into electric signals, which are recorded in a memory device. The electronic camera may be a video camera having a memory device composed of a magnetic tape or may be a digital camera having a memory device composed of an IC (Integrated Circuit) memory or a floppy disk.

In recent years, electronic cameras have emerged with a freely rotating image pickup unit having an optical lens system and an image pickup device attached to the electronic camera body.

Such electronic cameras have an LCD (Liquid Crystal Display) monitor as a viewfinder at the back of the body and allow a user to rotate the image pickup unit to a certain position so the user can take a picture of oneself while viewing the LCD monitor.

However, the lens surface can be easily scratched due to impurities such as dust. A conventional camera includes a lens cover in front of the lens for its protection and the user can open or close the lens cover depending on whether the camera is in use or not.

The above mentioned lens cover is usually a lens cap that is placed or removed manually by a user. The inconvenience of manually removing a lens cap often forces a user to carry the camera without the cap on the lens, which causes scratches on the surface of the camera lens.

SUMMARY OF THE INVENTION

In view of the drawbacks described above, it is an object of the present invention to provide a camera having a lens cover for an image pickup unit that prevents scratches on the lens surface.

The present invention provides a camera with a body, a freely rotating image pickup unit including an optical lens system and an image pickup device, a lens cover, and a lens cover driving mechanism that drives the lens cover to open while the image pickup unit rotates from an unused position in one direction within a predetermined range and that drives the lens cover to close while the image pickup unit rotates in the other direction within a predetermined range.

BRIEF DESCRIPTION OF THE DRAWINGS

The above objects and features of the present invention will be apparent from the following description of a preferred embodiment with reference to the accompanying drawings.

DETAILED DESCRIPTION OF THE PREFERRED EMBODIMENTS

Reference will now be made in detail to a first preferred embodiment of the present invention, examples of which are illustrated in the accompanying drawings.

Figure 6:
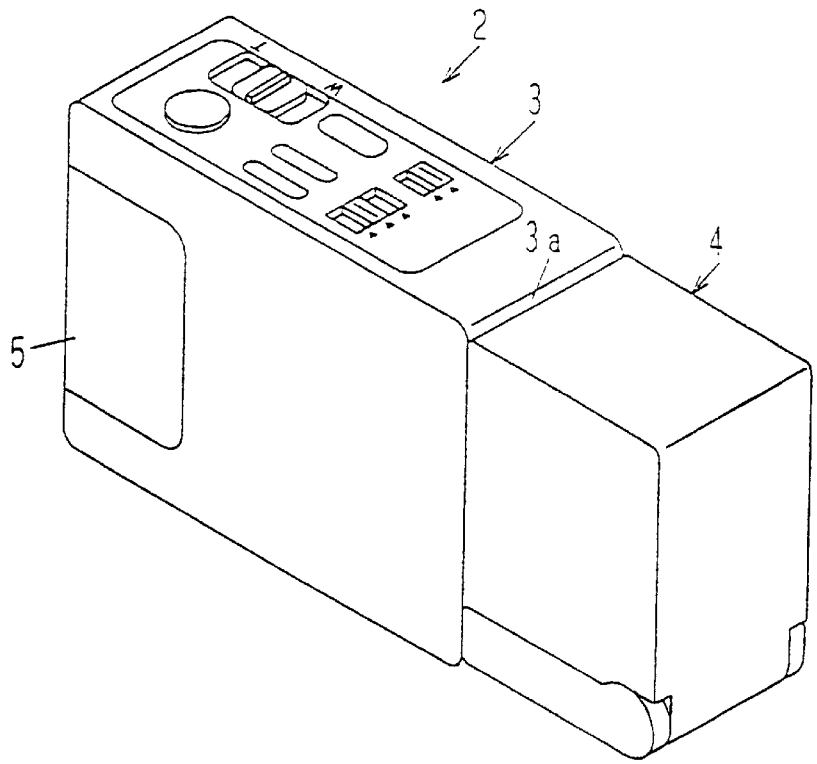
FIG. 6 is a front perspective view of the digital camera in accordance with the first preferred embodiment of the present invention.

As shown in FIG. 6, the image pickup unit 4 is installed on an axle (not shown) to rotate freely along the right side 3a of the camera body 3. In a preferred embodiment of the present invention, an unused position is defined as a position which the image pickup unit 4 is positioned along the right side 3a of the camera body 3 without protrusion. The grip 5 is formed on the left side of the camera body 3, and is gripped when taking a picture.

Figure 4:
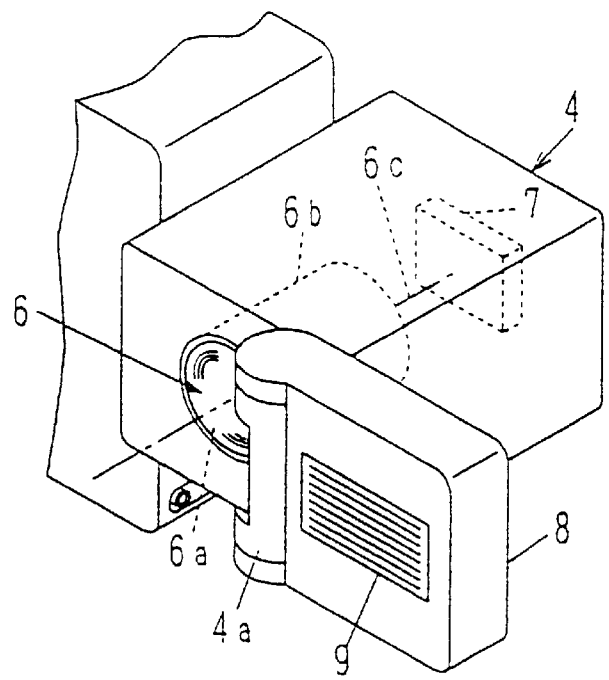
FIG. 4 is a perspective view illustrating the image pickup unit rotated approximately 90° in the clockwise direction in accordance with the first preferred embodiment of the present invention.

Referring to FIG. 4, the image pickup unit 4 includes an optical lens system 6 and the image pickup device 7. The optical lens system 6 includes a zoom lens 6a and a lens barrel 6b. The image pickup device 7, such as a color CCD, is formed on a circuit board on which a driver circuit is formed. The image pickup device 7 converts an image formed by the optical lens system 6 into electric signals.

The lens cover 8 is installed on the protrusion unit 4a which is formed at the right-hand side of the image pickup unit 4, and is able to close the front of the optical lens system 6 by rotating a pivot axis around 4a. A lens cover driving mechanism disclosed in FIGS. 2 and 3 moves the lens cover 8 to the open position (as shown in FIG. 3) while the image pickup unit 4 rotates approx. 90° from the unused position in a clockwise direction and moves to the closed position while the image pickup unit 4 rotates approx. 90° to the unused position in a counterclockwise direction.

In FIG. 4, numeral 9 indicates a strobe light. When the lens cover 8 is in a closed position, the strobe light 9 is located inside facing the front of the optical lens system 6. The strobe light 9 is aligned with the optical lens system 6 when the lens cover 8 is opened. In the optical lens system 6, the zoom lens 6a moves along an optical axis 6c to change focal lengths.

Figure 7:
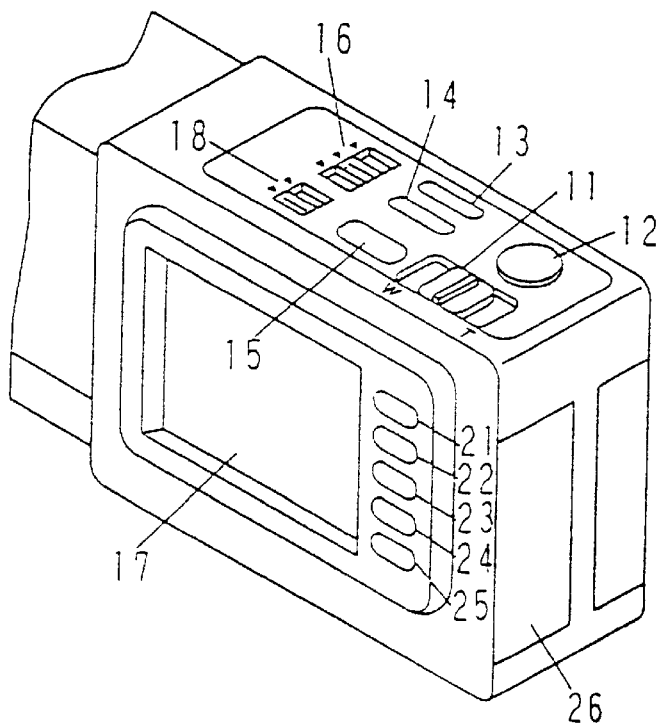
FIG. 7 is a rear perspective view of the digital camera in accordance with the first preferred embodiment of the present invention.

Referring now to FIG. 7 which is a rear perspective view of the camera body 3, there is illustrated a zoom switch 11 that changes a focal length, a release button 12, a flash button 13 that enforces a strobe flashing, a self timer button 14 that allows a user to take a picture at a predetermined time, a power button 15, a resolution-change knob 16 that allows a user to select among three different levels of resolution, and an exchange knob 18 that enables a LCD monitor 17 to switch between a monitor for a photographed image and a finder in the upper part of the camera body 3.

At the back of the camera body 3, there is an LCD monitor 17, a display button 21 that can display the image to be photographed on the LCD monitor 17, a photographing mode selection button 22 that sets a mode such as a red-eye reduction mode or night photography mode, etc., a zoom button 23 that magnifies an image to a predetermined magnification on the LCD monitor 17, a displaying button 24 that displays the capacity of a battery or the number of available film frames and a monitor button 25 that switches the LCD monitor 17 to display the image from an external source.

The camera includes an image processing circuit board that converts image signals by digital processing or gamma processing, a memory card, and a battery inside its body 3. The memory card connects to terminals of the image processing circuit board and records digital video signals representing a photographed image. The memory card is able to be inserted into or taken out of the camera body 3 by opening the cover 26 installed on the left side of the camera body 3. A magnetic memory device such as a floppy disk can be used instead of the memory card.

Figure 5:
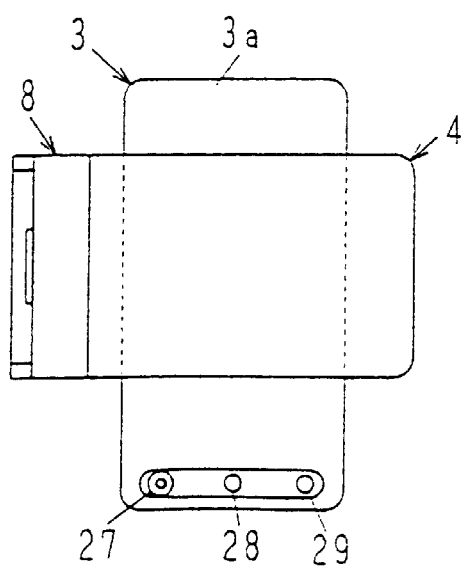
FIG. 5 is a side view illustrating the image pickup unit rotated approximately 90° in the clockwise direction in accordance with the first preferred embodiment of the present invention.

As shown in FIG. 5, on the bottom of the right side 3a of the camera body 3, there is a digital video terminal (RS-232C terminal) 27 for connecting to a personal computer, an analog video terminal 28 for connecting to a television receiver, and a power terminal 29 for connecting an external DC (direct current) power supply on the bottom of the right side 3a of the camera body 3. The terminals 27, 28, and 29 are hidden under the image pickup unit 4 when the image pickup unit 4 rotates to the unused position.

Figure 1:
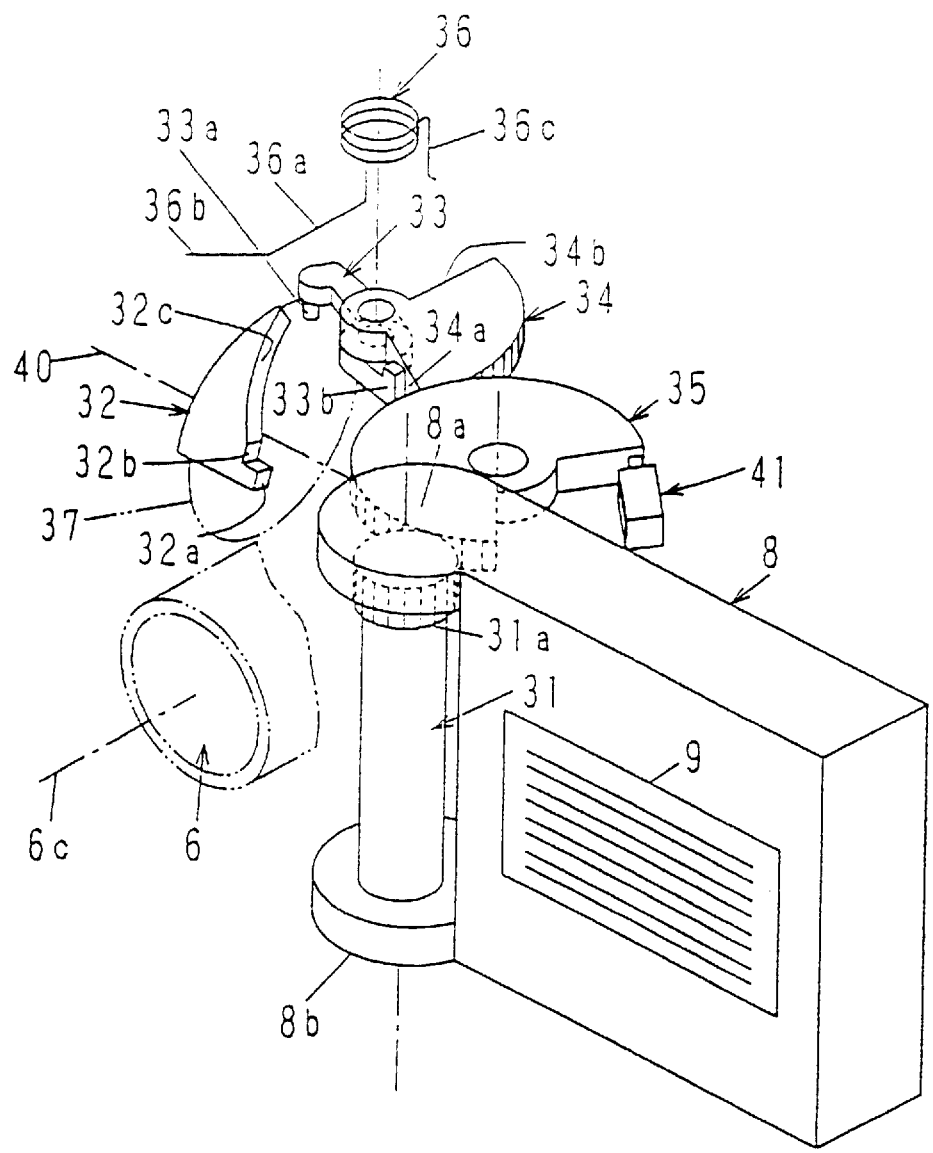
FIG. 1 is a perspective view illustrating a lens cover and lens cover driving part of a digital camera in accordance with a first preferred embodiment of the present invention.

As shown in FIG. 1, the driving axle fixing pieces 8a and 8b are fixed on upper and lower ends of the lens cover driving axle 31. The driving axle fixing pieces 8a and 8b pass through the protrusion 4a in the vertical direction against the optical axis 6c. The lens cover 8 rotates freely around the lens cover driving axle 31. The lens cover driving axle 31 has a driving gear 31a formed thereon.

A lens cover driving unit of the lens cover 8 includes a driving gear 31a, an angle cam 32, a lever 33, transfer gears 34 and 35, a coil spring 36, and a non-cam member 37.

A pin 33a and projection 33b are formed on the upper arm and lower arm of the lever 33, respectively. A coil spring 36 is engaged at the end of 36a with the projection 33b, and the lever 33 is pressed in the counterclockwise direction by the coil spring 36. An angle cam 32 is formed at the right side 3a of the camera body 3 varying about 90° around the center 40 of a rotating axle of the image pickup unit 4. The angle cam 32 includes the highest vertex member 32a, the plane 32b cutting the angle cam 32, and the tilted plane 32c which is sloped down toward the non-cam member 37.

When the image pickup unit 4 is in the unused position, the pin 33a is placed on the plane 32b. The lever 33 rotates in the counterclockwise direction against pressure of the coil spring 36, the image pickup unit 4 can be prevented from free rotation at the unused position because the plane 32b is strongly pressing the pin 33a. Also, the pin 33a moves along the tilted plane 32c when the image pickup unit 4 rotates. Because the highest vertex member 32a stops the movement of the pin 33a, the image pickup unit 4 is prevented from rotating in the counterclockwise direction beyond a predetermined range.

As shown in FIG. 3, if a user rotates the image pickup unit 4 about 90° in the counterclockwise direction from the unused position, the pin 33a moves along the tilted plane 32c and then is stopped at the non-cam member 37. The lever 33 rotates in the counterclockwise direction in accordance with movement of the pin 33a. Because the projection 33b of the lever 33 is opposite to the end plane 34a of a transfer gear 34, the transfer gear 34 and the lever 33 rotate integratedly. A transfer gear 35, which transfers rotatory power from transfer gear 34 to driving gear 31a, makes the driving gear 31a rotate in the counterclockwise direction when the transfer gear 34 rotates in the counterclockwise direction. Therefore, the lens cover 8 moves to the open position via the transfer gear 35.

Figure 2:
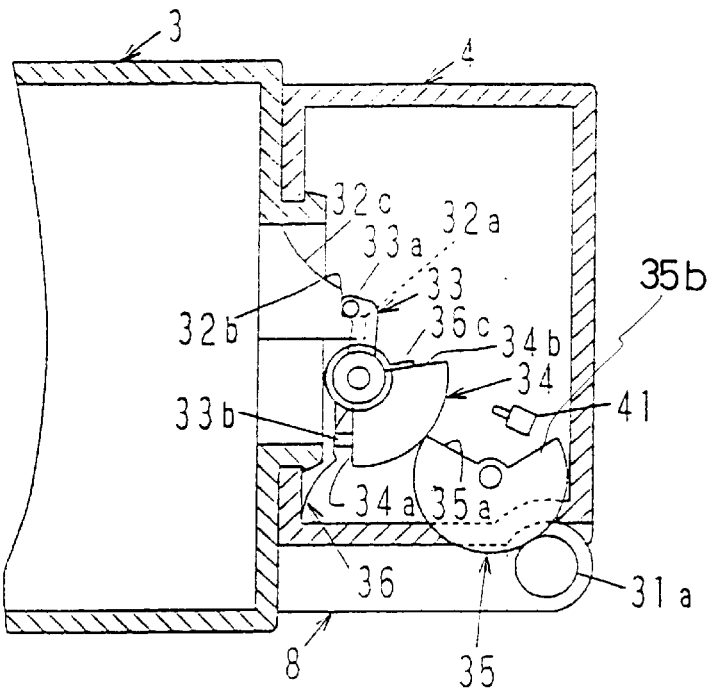
FIG. 2 is a cross-sectional view illustrating an image pickup unit at an initial position in accordance with the first preferred embodiment of the present invention.
Figure 3:
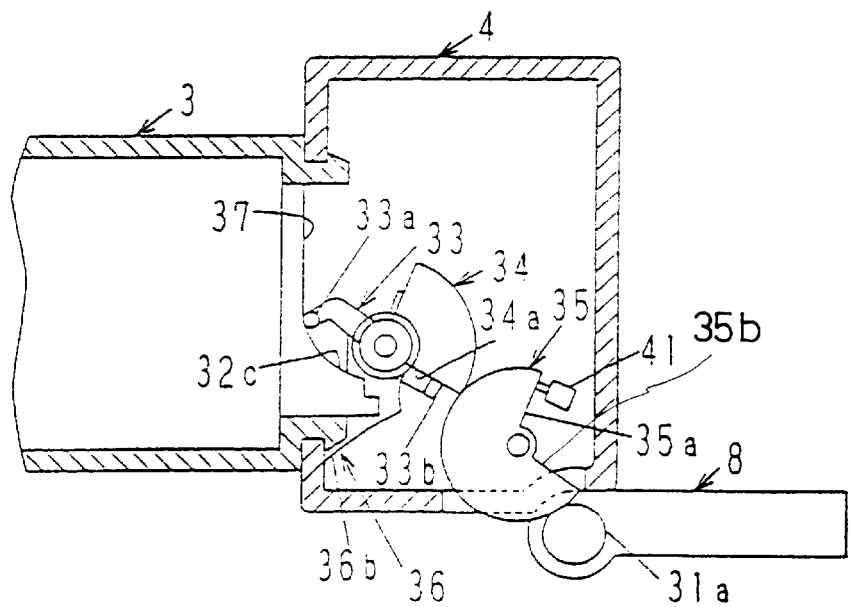
FIG. 3 is a cross-sectional view illustrating the image pickup unit rotated approximately 90° in the clockwise direction in accordance with the first preferred embodiment of the present invention.

As shown in FIG. 2, when the image pickup unit 4 rotates about 90° in the counterclockwise direction to the unused position, the pin 33a moves along the tilted plane 32c because of pressure by the coil spring 36. Then, the pin 33a stops at the plane 32b by the highest vertex 32a. The lever 33 moves in the clockwise direction in accordance with the movement of the pin 33a. The opposite end 36c of the coil spring 36 is engaged with the end plane 34b. Therefore, the end plane 34a and projection 33b are pressed by the coil spring 36, and the transfer gear 24 rotates together with the lever 33 when the lever 33 rotates in the clockwise direction. When the transfer gear 34 rotates in the clockwise direction, the transfer gear 35 makes the driving gear 31a rotate in the clockwise direction, and the lens cover 8 moves to the closed position via the driving gear 31a.

The non-cam member 37 moves within a 270° range around the center 40 of the driving axle. When the pin 33a moves in the non-cam member 37, the lever 33 rotates in the counterclockwise direction by pressure of the coil spring 36. If the lever 33 rotates in the counterclockwise direction, the lens cover 8 moves to the open position by the transfer gears 34, 35 and driving gear 31a, the non-cam member 37 rotates the image pickup unit 4 within a 270° range where the non-cam member 37 is formed.

Since the lens cover driving unit mechanically moves the lens cover 8 in synchronization with the rotation of the image pickup unit 4, gear breakage can be avoided even when the lens cover 8 is forced to open or closed without rotating the image pickup unit 4.

When the image pickup unit 4 is in the unused position, the transfer gear 34 rotates in the counterclockwise direction by the driving gear 31a and transfer gear 35. At that time, because the pin 33a is placed on the plane 32b, the lever 33 cannot rotate in the counterclockwise direction. However, because the body of the transfer gear 34 rotates in the counterclockwise direction against the pressure of the coil spring 36, it is possible that the pin 33a rotates in the counterclockwise direction.

When the image pickup unit 4 rotates from the unused position to the clockwise direction over a 90° range and the lens cover 8 is closed, the transfer gear 34 rotates to the clockwise direction by the driving gear 31a and the transfer gear 35. Because the transfer gear 34 and the lever 33 are pressed in the counterclockwise direction by the coil spring 36, the transfer gear 34 and lever 33 rotate together against the spring power of the bent part 36b of the coil spring 36.

Also, as shown in FIG. 2 and FIG. 3, a micro switch. 41 is placed between the end planes 35a and 35b of the transfer gear 35 which is cut like a folding pan. The micro switch 41 turns on external power when the image pickup unit 4 is rotated over a 90° range from the unused position in the clockwise direction and the end plane 35a touches the micro switch 41. When the image pickup unit 4 is in the unused position and the end plane 35a does not touch the micro switch 41, the micro switch 41 turns off the external power. It is possible to place the pressing portion of the micro switch 41 on the right side 3a of the camera body 3 and to have it directly touch the left side of the image pickup unit 4.

A user may hold a digital camera with the grip 5 and rotate the image pickup unit 4 about 90° in the clockwise direction. In this case, the pin 33a moves along the tilted plane 32c and stops at the non-cam member 37. Following the movement of the pin 33a, the lever 33 rotates in the counterclockwise direction and the driving gear 31 rotates in the counterclockwise direction by the transfer gears 34 and 35. The lens cover 8 thus moves to the open position and then the strobe light 9 is aligned with the optical lens system 6.

At the same time, the transfer gear 35 rotates in the clockwise direction and the end plane 35a of the transfer gear 35 presses the micro switch 41. This supplies the external power to the LCD monitor 17 to turn it on. A user views an image on the LCD monitor 17 and presses the release button 12. If the release button 12 is pressed by the user, the image pickup device 17 captures the image. Color signals and synchronizing signals generated by the image pickup device 7 go through the image processing circuit board to be further processed. Then, the color signals and synchronizing signals are translated to digital video signals. The digital video signals are recorded in the memory card.

When a user wants to photograph oneself, the user rotates the image pickup unit 4 about 180° in the clockwise direction in order that the optical lens system 6 turns towards oneself.

Because the terminals 27, 28, and 29 are formed on the upper portion of the camera body 3a, the terminals 27, 28, and 29 are at the lower end of the image pickup unit 4 when the image pickup unit 4 rotates about 90° from the unused position in the clockwise direction. If a personal computer is connected to the digital video terminal 27 by an RS-232C cable, the photographed image is output to the personal computer and the user is able to view the photographed image on the personal computer monitor. Of course, the photographed image can also be viewed on the LCD monitor 17.

When the digital camera 2 is off, the user rotates the image pickup unit 4 in the counterclockwise direction. When the image pickup unit 4 rotates about 90° in the counterclockwise direction until it is in the unused position, the pin 33a is placed on the plane 32b along the titled plane 32c and stops at the highest vertex part 32a. The lever 33 rotates in the clockwise direction following the movement of the pin 33a, and the lens cover 8 is closed by the transfer gears 34 and 35 and driving gear 31a.

Therefore, the lens cover 8 covers the front of the optical lens system 6. Also, the strobe light 9 is hidden inside facing the front of the optical lens system 6. Because the optical lens system 6 is folded from the front of the optical lens system 6 toward the image pickup unit 4 and does not protrude out of the camera body 3, the design of the digital camera 2 is compact, and carriage of the digital camera 2 becomes easy.

If the transfer gear 35 rotates in the counterclockwise direction, the end plane 35a of the transfer gear 35 is separated from the micro switch 41. The external power supply for the LCD monitor 17 is disconnected, to turn the LCD monitor 17 off. However, if a user presses the power button 15, external power for the LCD monitor 17 is supplied and the LCD monitor 17 operates. Therefore, the photographed image is able to be viewed on the LCD monitor 17.

Reference will now be made in detail to the second preferred embodiment of the present invention, examples of which are illustrated in the accompanying drawings.

Figure 8:
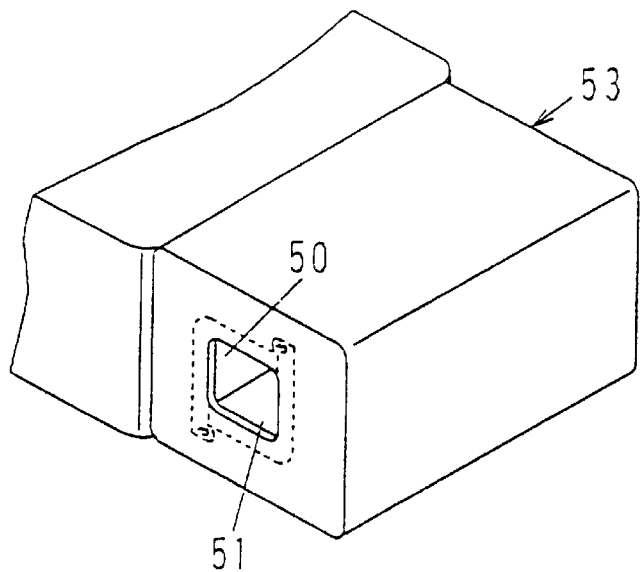
FIG. 8 is a perspective view illustrating the image pickup unit in the unused position of the digital camera in accordance with a second preferred embodiment of the present invention.
Figure 9:
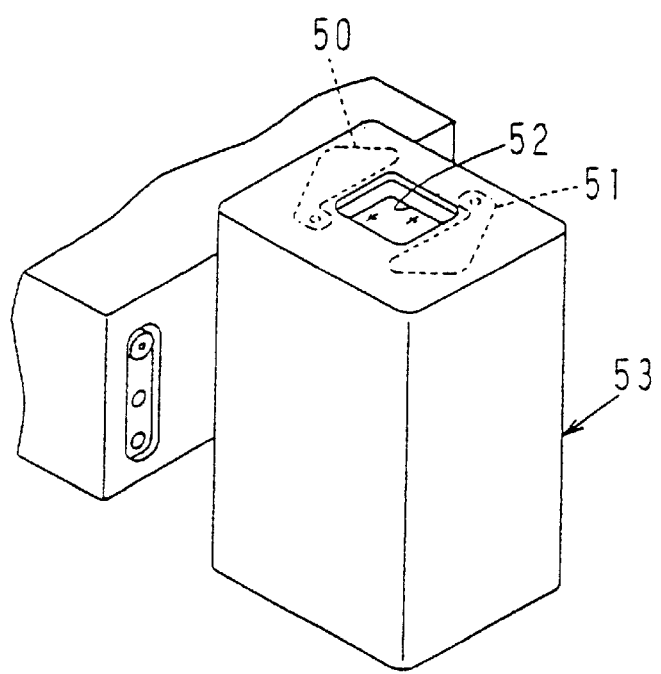
FIG. 9 is a perspective view illustrating the image pickup unit rotated approximately 90° in the clockwise direction in accordance with the second preferred embodiment of the present invention.
Figure 10:
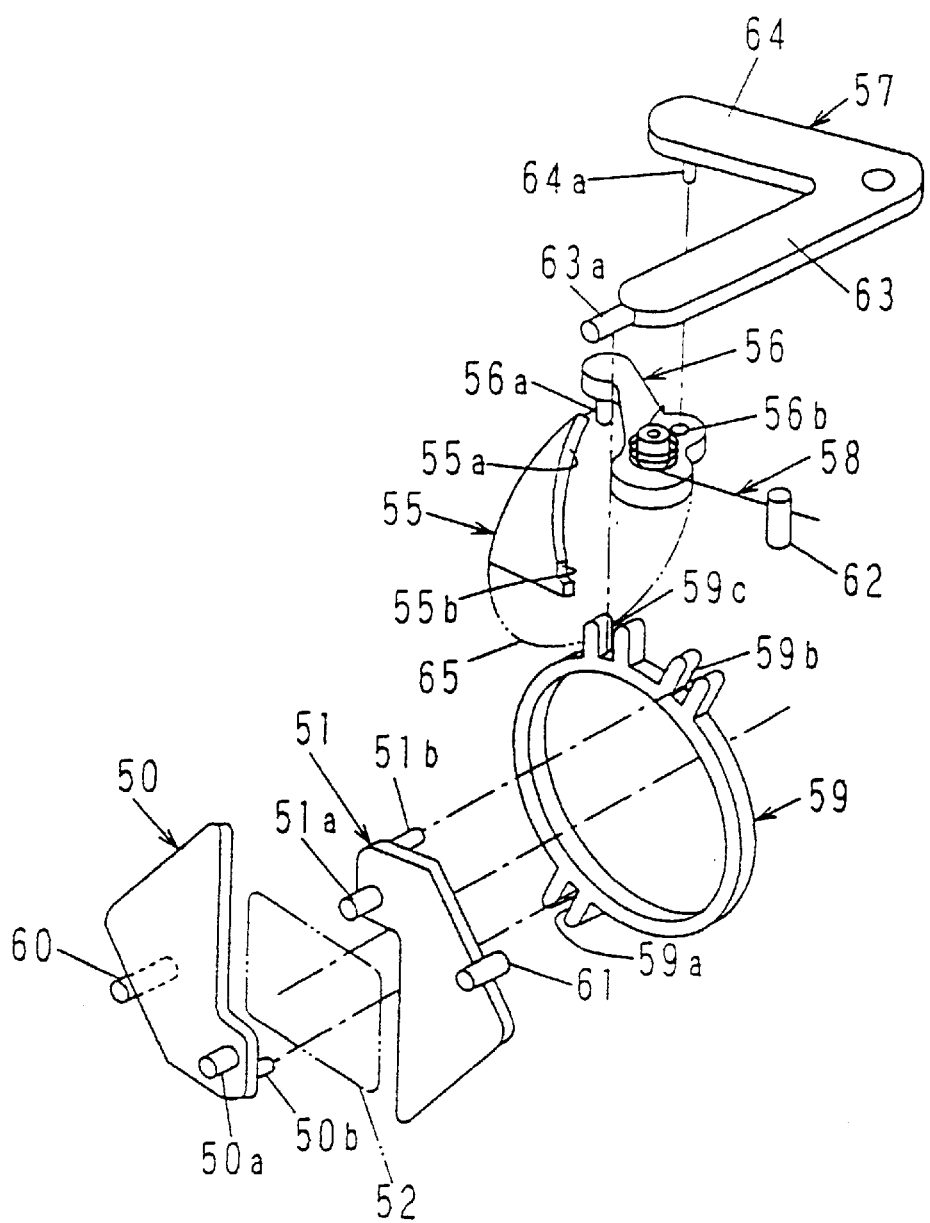
FIG. 10 is a perspective view illustrating a lens cover and lens cover driving part in accordance with the second preferred embodiment of the present invention.

As shown in FIGS. 8–10, a lens cover comprising a pair of lens covers 50 and 51 are placed in front of the optical lens system 52. The lens cover driving unit includes an angle cam 55, a driving lever 56, a double lever 57, a coil spring 58, a driving ring 59. The lens cover driving unit moves the lens covers 50 and 51 to the open position when the image pickup unit 53 rotates about 90° from the unused position to used position in the clockwise direction (as shown in FIG. 9), and makes lens covers 50 and 51 move to the closed position where the optical lens system 52 is covered when the image pickup unit 53 rotates about 90° in the counterclockwise direction to the unused position. Pins 60, 61, and 62 are formed on the inside wall of the image pickup unit 53.

The lens covers 50 and 51 freely rotate along the axles 50a and 51a. The pins 60 and 61 are stoppers formed in a direction in which the lens covers 50 and 51 are opened. The driving axles 50b and 51b are each inserted into a pair of insert portions 59a and 59b formed around the driving ring 59. The pin 56a is formed in the upper arm of the driving lever 56. The end of the coil spring 58 is engaged with the driving lever 56. The opposite end of the coil spring 58 is engaged with the pin 62. The driving lever 56 is pressed in the counterclockwise direction by the coil spring 58.

The angle cam 55 is formed like that of the first embodiment of the present invention. The insert portion 59c is formed near the insert portion 59b around the driving ring 59. The pin 63a is inserted into the insert part 59c. The pin 64a is formed at the end of the first lever 63 of the double lever 57. The pin 64a is inserted into the hole 56b formed in the driving lever 56.

When the image pickup unit 53 rotates clockwise about 90° from the unused position, the pin 56a moves along the tilted plane 55a, and stops at the non-cam portion 65. The driving lever 56 rotates counterclockwise following the movement of the pin 56a and makes the double lever 57 rotate clockwise. The driving ring 59 rotates counterclockwise, and moves the lens covers 50 and 51 to the open position.

When the image pickup unit 53 rotates about 90° counterclockwise to the unused position, the pin 56a moves along the tilted plane 55a and reaches the plane 55b. The driving lever 56 makes the double lever 57 rotate counterclockwise, as it rotates clockwise via the pin 56a. So the driving ring 59 rotates clockwise and closes the lens covers 50 and 51.

Figure 11:
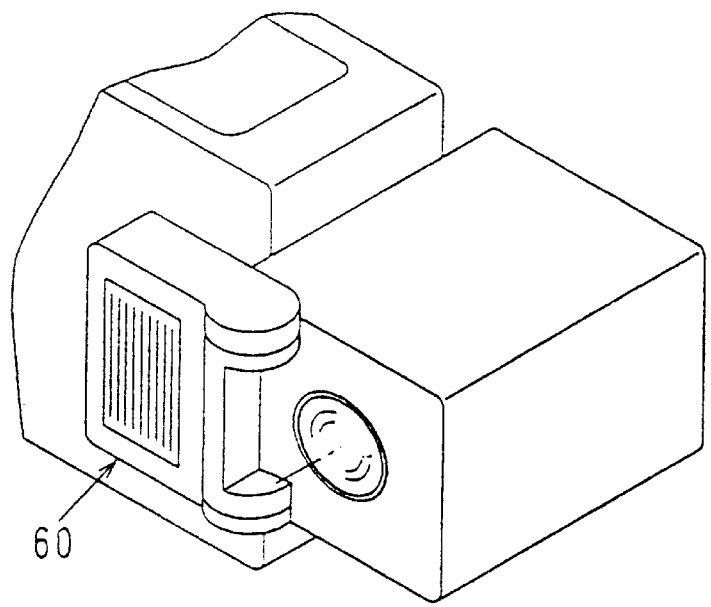
FIG. 11 is a perspective view illustrating the lens cover installed to open in the left direction in accordance with a third preferred embodiment of the present invention.

The first embodiment of the present invention discloses the lens cover 8 opening to the right-hand side. However, FIG. 11 shows another embodiment of the present invention that has a lens cover 60 opening to the left-hand side. Also, in another embodiment, the lens cover opens or closes freely upward or downward. Moreover, the lens cover 60 can be dissected such that it opens and closes horizontally or vertically. The lens cover 60 may also open or close in the left or right direction from the center like a sliding door.

Also, in the second embodiment of the present invention, it is possible to form the lens cover of a sliding type. Moreover, a steep slope of the tilted plane of the angle cam may enable the lens cover to open or close by pickup unita 30° to 60° rotation of the image pick-up unit.

Figure 12:
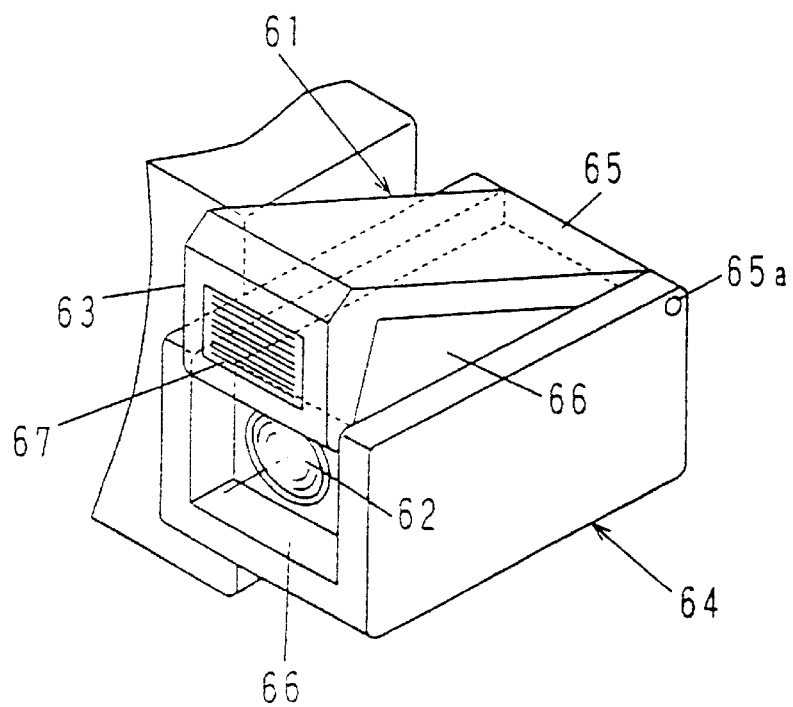
FIG. 12 is a perspective view illustrating the lens cover installed to open in the upper direction in the digital camera in accordance with a fourth preferred embodiment of the present invention.

FIG. 12 shows a preferred embodiment of the present invention that has a lens cover 61 opening freely upward or downward. The lens cover 61 is formed in a "<" shape, and the lens cover 61 includes a cover portion 63 that covers the front of an optical lens system 62, and an arm portion 65 formed on the right and left sides of an image pickup unit 64 by the axle 65a. When the image pickup unit 64 is in the unused position, the lens cover 61 is inserted into the "<" shaped bent part as the lens cover 61 rotates counterclockwise, and the cover portion 63 moves to cover the front of the optical lens system 62. When the image pickup unit 64 rotates to a used position, the optical lens system 62 is revealed as the lens cover 61 rotates e clockwise and the cover portion 63 moves upward from the front of the optical lens system 62. The strobe light 67 formed with a slope in front of the cover portion 63 is facing the front when the lens cover 61 is open.

Above-mentioned preferred embodiments of the present invention illustrate a digital camera using an IC memory or a floppy disk as a recording device, but the present invention can be applied to a video camera using a magnetic tape as a recording device.

As described above, an advantage of the electronic camera in accordance with the preferred embodiment of the present invention lies in preventing the breakdown of the optical lens system by including a lens cover that opens or closes in front of the image pickup optical group, where the lens cover driving unit moves the lens cover to open while the image pickup unit rotates from the unused position to the used position within the predetermined angles and also moves the lens cover to close when the image pickup unit rotates in the other direction.

The image pickup unit can rotate freely beyond the predetermined ranges. In such a case, the image pick-up unit can rotate with its lens cover open to any position for photographing an object.

Moreover, it is possible to prevent a breakdown of the strobe light because the lens cover rotates around the rotating axle that is vertical against the optical axis and the strobe light is placed inside the cover to face the image pickup optical group when the lens cover is closed.

While it has been shown and described what is at present considered the preferred embodiments of the invention, it will be obvious to those skilled in the art that various changes and modifications can be readily made therein without departing from the scope and spirit of the invention as defined by the appended claims.

What is claimed is:

1. A camera, comprising:

a body;

an image pickup unit including an optical lens system and an image pickup device that rotate around the body freely;

a lens cover opening and closing in front of the optical lens system group; and a lens cover driving unit for driving the lens cover to open while the pickup image unit rotates from an unused position in a first direction within a predetermined range, and driving the lens cover to close while the pickup image unit rotates in a second direction within said predetermined range.

2. The camera of claim 1, wherein the image pickup unit freely rotates over the predetermined range, and the lens cover is opened when the image pickup unit is rotated over the predetermined range.

3. The camera of claim 1, wherein a portion of the lens cover is formed at a lens cover driving axle, said lens cover driving axle being inserted into a protrusion formed on the image pickup unit, and wherein an axle fixing portion is formed at the upper and lower ends of the lens cover driving axle.

4. The camera of claim 1, wherein a strobe light is formed on one part of the lens cover.

5. The camera of claim 1, wherein the cover driving unit comprises, a driving gear formed at the one part of the lens cover;

a first transfer gear and a second transfer gear engaged with said driving gear and positioned within the image pickup unit;

a lever capable of rotating with the second transfer gear integratedly;

a coil spring engaged to press an end plane of the second transfer gear and a lower arm of the lever;

an angle cam protruded from the body and having a tilted plane for moving an upper arm of the lever and a highest vertex plane and a plane to stop the upper arm; and a non-cam member being formed in the one plane of the body around the angle cam.

6. The camera of claim 3, wherein a driving gear is formed around the upper periphery of the lens cover driving axle.

7. The camera of claim 5, wherein the first transfer gear has a cross section of a folding pan.

8. The camera of claim 7, wherein a micro switch is formed at the cross section of the first transfer gear, said micro switch contacting the end plane of the first transfer gear in accordance with a rotation of the first transfer gear.

9. The camera of claim 5, wherein the angle cam moves along a 90° range around the center of a rotating axle of the image pickup unit.

10. A camera comprising:

a body;

an image pickup unit including an optical lens system and an image pickup device that rotate around the body;

a pair of lens covers opening and closing in front of the optical lens system; and a lens cover driving unit for driving the lens cover to open while the image pickup unit rotates from an unused position in a first direction within a predetermined range, and driving the lens cover to close while the image pickup unit rotates in a second direction within the predetermined range.

11. The camera of claim 10, wherein the pair of lens covers are formed at the front of the optical lens system, and rotate around axles.

12. The camera of claim 10, wherein pins are formed on an inner plane of the image pickup unit in the direction of opening of the pair of lens covers to stop the pair of lens covers.

13. The camera of claim 10, wherein the lens cover driving units comprise:

an angle cam protruded from the body connected to the image pickup unit;

a driving lever having an upper arm rotating along a tilted plane of the angle cam;

a double lever having a first lever and a second lever, wherein the second lever has a pin which is inserted into a hole formed at the driving lever;

a coil spring one end of which is engaged with said driving lever, and the other end of which is engaged with a pin formed at one plane of the image pickup unit;

a driving ring for opening the pair of lens covers in accordance with the rotation of the double lever, said driving ring being connected to said first lever of said double lever and to said pair of lens covers.

* * * * *